A. ATWOOD.
Car Wheel.
No. 80,380.
Patented July 28, 1868.
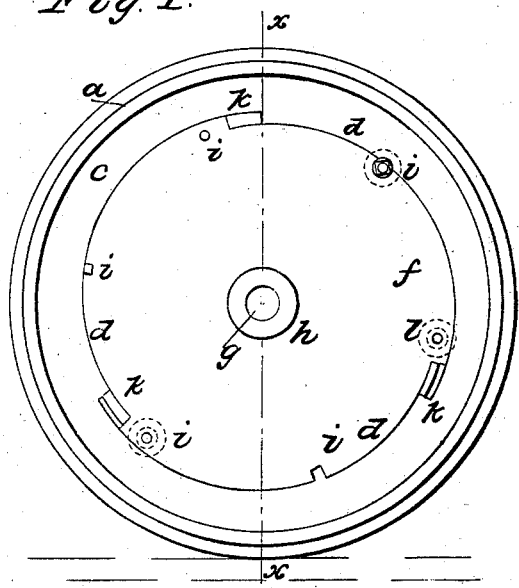
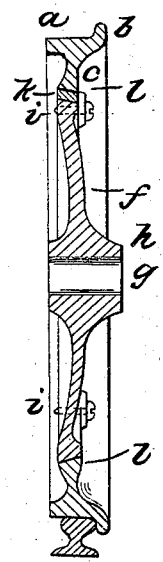
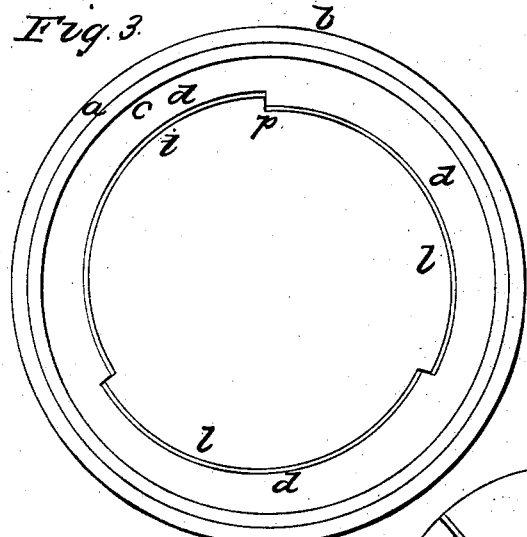
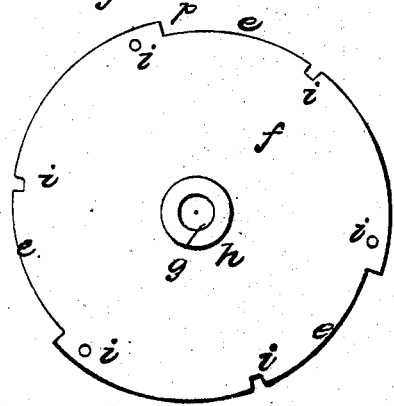
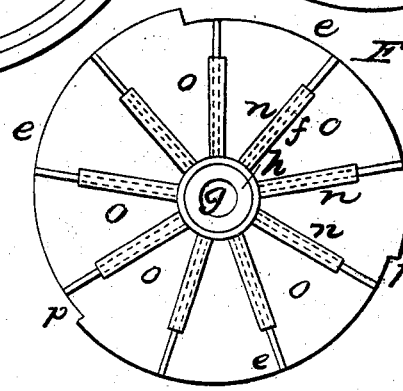

United States Patent Office.

ANSON ATWOOD, OF NEW YORK, N. Y.

Letters Patent No. 80,380, dated July 28, 1868.

---

IMPROVED CAR-WHEEL.

---

The Schedule referred to in these Letters Patent and making part of the same.

---

TO ALL WHOM IT MAY CONCERN:

Be it known that I, ANSON ATWOOD, of the city of New York, in the State of New York, have invented a new and useful Improvement in Wheels for Railroad-Cars; and I hereby declare that the following is a full, clear, and accurate description thereof, reference being had to the accompanying drawings, making part of these specifications.

The tread or rim part of a car-wheel being known always to wear out by use much sooner than the nave and disk or plate part, my improvement consists in so constructing the wheel, by casting the same in two parts, and so fastening them together, to compose the wheel as a whole, that when the tread or rim becomes worn and useless, that part can and may be easily removed, and a new rim substituted without disturbing the nave, and the part of the plate attached on the axle, thus saving both time and expense.

The rim, or the rim and such a portion of the disk or plate as will afford a sufficient degree of strength to the wheel to prevent it from breaking, may be cast in one, as the outer or exterior part, and the residue of the plate, and the hub or nave, are to be cast in one, to form the other or interior part of the wheel.

The internal arcs or curves of the rim or exterior part of the wheel, and the external arcs or curves of the interior or nave part of the wheel, are composed of three equal and corresponding and fitting eccentrics, as hereinafter described, (the wheel may, however, be constructed with a greater or less number,) so that when the corresponding parts are placed together, by turning the parts in opposite directions, they come in close contact with one another the greater part of the length of the corresponding arcs, and the more the parts are thus turned, the closer will become the contact, and the firmer they become fixed and united, as hereinafter described, analogous to a conical male screw driven into a corresponding female screw. The parts of the wheel may also be firmly put together by partially heating the exterior or rim portion before putting them together, thus, by shrinking, to fasten it upon the interior or cooler part.

These parts of the wheel are also correspondently bevelled, for the purpose of keeping them in place on the one side of the wheel, and on the other side bolts and bolt-heads and washers, or flanges, or brackets, are used, to keep the parts in position in that direction; or one part of the wheels may be formed with the eccentric curved edges concave, and the other part with the corresponding curved edges convex, so as to fit into one another, and thus to be kept in place, and keys are used to prevent the parts from loosening by turning back, and for the purpose of tightening them by driving them forward or together. The interior portion of the wheel may be made wholly of cast iron, or partly of cast iron and partly of wood, as hereinafter described.

The eccentric curves are formed by describing a circle from the centre of the axle of the wheel, at the points of the greatest distance from the centre to the curve line of separation between the exterior and interior parts of the wheel. Then take three points equidistant from the centre of the circle, say from one-fourth to three-fourths of an inch, (according to the desired eccentricity of the curve required to be described,) the three points also to be equidistant from one another, so that the eccentric curves, when described, shall divide the circumference of the circle into three equal parts. From these three points, as centres, and the points where the other leg of the compass will be farthest within the circumference of the circle as initial points, describe arcs of a circle, until they respectively vanish in the circumference of a circle, as the terminal points of the several eccentric curves. Radii of the circle will pass through every preceding terminal and succeeding initial point, and unite the same, forming the projections from or introcessions towards the circumference of the circle.

As the exterior and interior parts of the wheel conform or correspond to one another, no other description need be given in order to enable the proper construction of the interior part of the wheel, only that it be made slightly smaller, so that it will freely move, and partially turn within the exterior part of the wheel.

Figure 1 represents a vertical face view of the outside of the wheel, with the exterior and interior parts put together, forming the wheel as a whole, the eye being at the centre of the axle of the wheel, showing the eccentric curves, where the exterior and interior parts of the wheel are united together with one key and three bolt-heads, and the openings or holes for the others, and exhibiting also the tread in perspective, and the flange outside of the tread, forming together the rim of the wheel.

Figure 2 represents a vertical section through the centre of the axis of the wheel, cut by a vertical plane at right angles to or facing the eye, exhibiting the bevelled edges where the two parts of the wheel are united.

Figure 3 represents a vertical face view of the exterior part of the wheel composing the tread and flange, forming the rim, and about three inches in width of the plate or disk of the wheel, with the eye at the centre of the axle, exhibiting the tread in perspective, the flange, and the interior eccentric curves.

Figure 4 represents a vertical face view of the interior part of the wheel, exhibiting the axis, hub, or nave, the three equal external eccentric curves, together with the bolt-holes and projections in the external curve line, produced by the line uniting the preceding terminal to every succeeding initial point of the respective eccentric curves.

Figure 5 represents a vertical face view of the interior part of the wheel, composed partly of cast iron and partly of wood, exhibiting nine spokes, or rather ribs or brackets, attached to and rising from a plate or disk on the reverse, about two inches in depth, with flanges extending on either side of the brackets for about two-thirds the length thereof, forming a slot on each side of the brackets, to hold triangular pieces of timber, which pieces of timber also appear, as well as the introcessions and projections in the external outline of the part formed by uniting every preceding initial to every succeeding terminal point of the respective eccentric curves.

The following letters respectively represent the same parts in all the foregoing figures, where such parts are exhibited thereon.

The letter $a$ represents the tread, $b$ the flange, together forming the rim; $c$, the part of the plate attached to the rim, forming the exterior part of the wheel; $d$, the arcs of the eccentric curves of the same part of the wheel; $e$, the arcs of the corresponding eccentric curves, forming the exterior outline of the interior part of the wheel; $f$, the part of the plate attached to the nave, together forming the interior part of the wheel; $i$, the bolts and bolt-holes; $k$, the key and key-holes; $l$, the bevelled edge of the interior line of the exterior part of the wheel; $m$, the brackets rising from and attached to the reverse plate, extending beyond the flanges attached thereto, to form the slots for fastening the triangular pieces of timber; $n$, the flanges; $o$, the timber used in forming a portion of the interior part of the wheel; and $p$, the introcessions and projections produced by uniting every preceding initial with every succeeding terminal point, and *vice versa*, of every successive eccentric curve, and the curve corresponding thereto.

What I claim as my invention, and desire to secure by Letters Patent, is—

1. The construction of the exterior part of the car-wheel with the ordinary chilled rim, or the rim with a part of the plate attached, having the interior edge thereof with introcessions and projections formed by eccentric curves, as and for the purpose before described.

2. The exterior and interior parts of the wheel in combination, constructed and fitted to one another in either of the modes above specified, forming the entire wheel, with the manner of putting the two parts together, and keeping them in place while in use, as and for the purpose before described.

ANSON ATWOOD.

Witnesses:
A. F. CUNNINGHAM,
S. H. SWETLAND.